United States Patent [19]
Lawley

[11] 3,815,330
[45] June 11, 1974

[54] APPARATUS FOR REMOVING OXYGEN FROM LIQUIDS

[76] Inventor: Clyde Murrell Lawley, 1008 Heidi Ave., Modesto, Calif. 95350

[22] Filed: Feb. 22, 1973

[21] Appl. No.: 334,736

[52] U.S. Cl.................................. 55/168, 55/196
[51] Int. Cl............................................. B01d 19/00
[58] Field of Search............... 55/53, 159, 168, 196; 426/475

[56] References Cited
UNITED STATES PATENTS

| | | | |
|---|---|---|---|
| 2,299,553 | 10/1942 | McKinnis | 55/53 X |
| 3,044,887 | 7/1962 | Smith et al | 426/475 |
| 3,301,685 | 1/1967 | Harwell | 426/475 |

*Primary Examiner*—Charles N. Hart
*Assistant Examiner*—Richard W. Burks
*Attorney, Agent, or Firm*—Roger B. Webster

[57] ABSTRACT

An apparatus—for removing oxygen from a pressure-fed, continuously-flowing liquid food product by the method of stripping the oxygen from the liquid by nitrogen—comprising, in a first stage, a close-to-atmosphere receptacle through which the liquid flows, the receptacle providing a headspace above a normal surface level of the liquid in the receptacle, means to disperse nitrogen into the liquid for upward transition therein, certain of the resultant oxygen-nitrogen gas mixture gassing off from or escaping the liquid and accumulating in the headspace, and instrumentalities associated with the receptacle operative to vent the accumulated gas mixture in the headspace to atmosphere in response to the liquid in the receptacle falling below said normal surface level and to introduce nitrogen under pressure into the headspace in response to the liquid in the receptacle rising above such normal surface level, whereby in either event to cause return of said surface level to normal.

In a second stage, connected in series to the first stage, the apparatus includes another closed-to-atmosphere receptacle likewise providing a nitrogen-inerted headspace above a normal surface level of the liquid in said other receptacle; the latter having separate instrumentalities associated therewith and of like function as those related to the first stage of the apparatus, whereby the remainder of the oxygen-nitrogen mixture, which gasses off from the liquid in said other receptacle, is accumulated in the headspace of the latter and vented therefrom to atmosphere.

10 Claims, 2 Drawing Figures

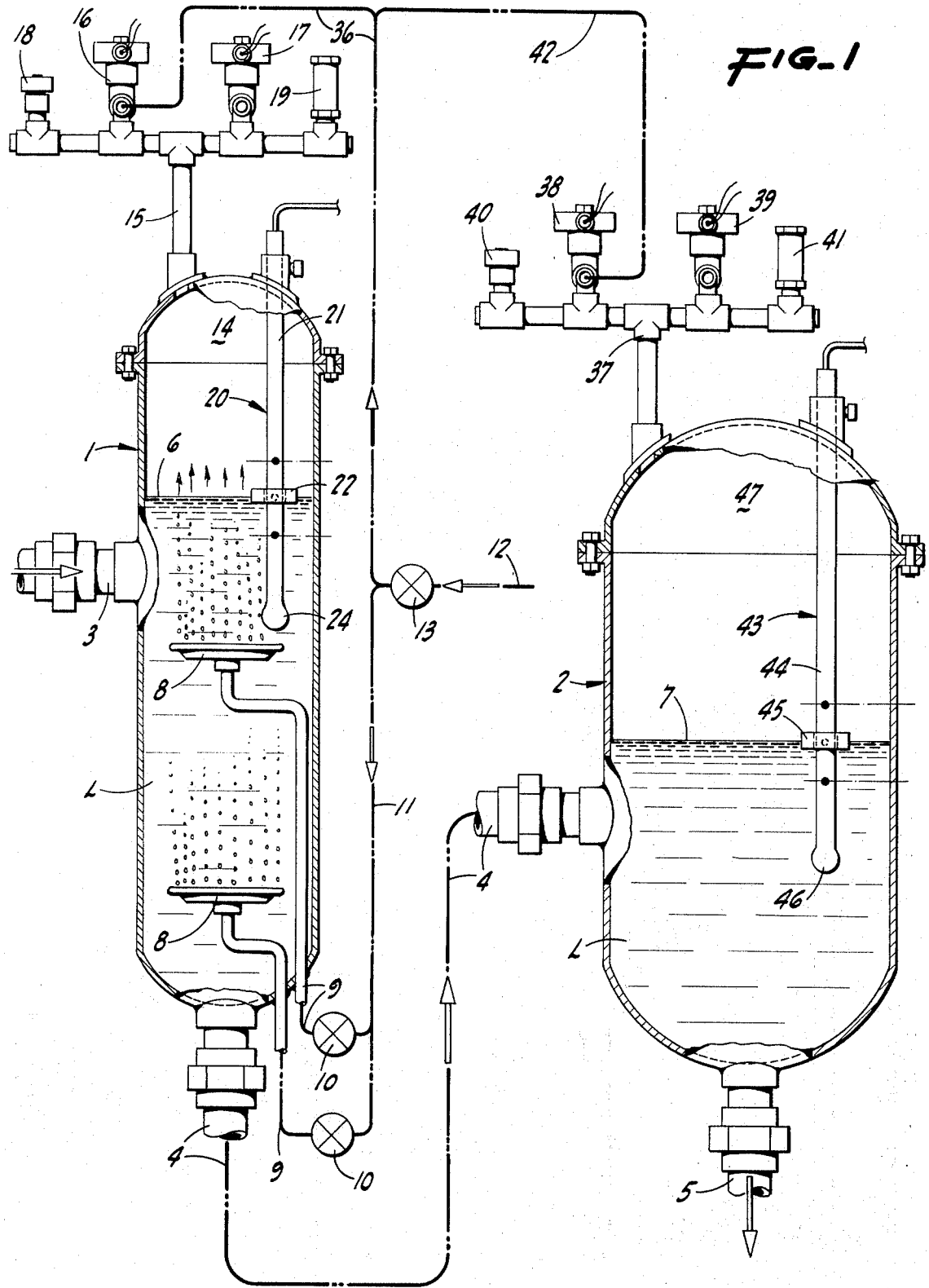
FIG_1

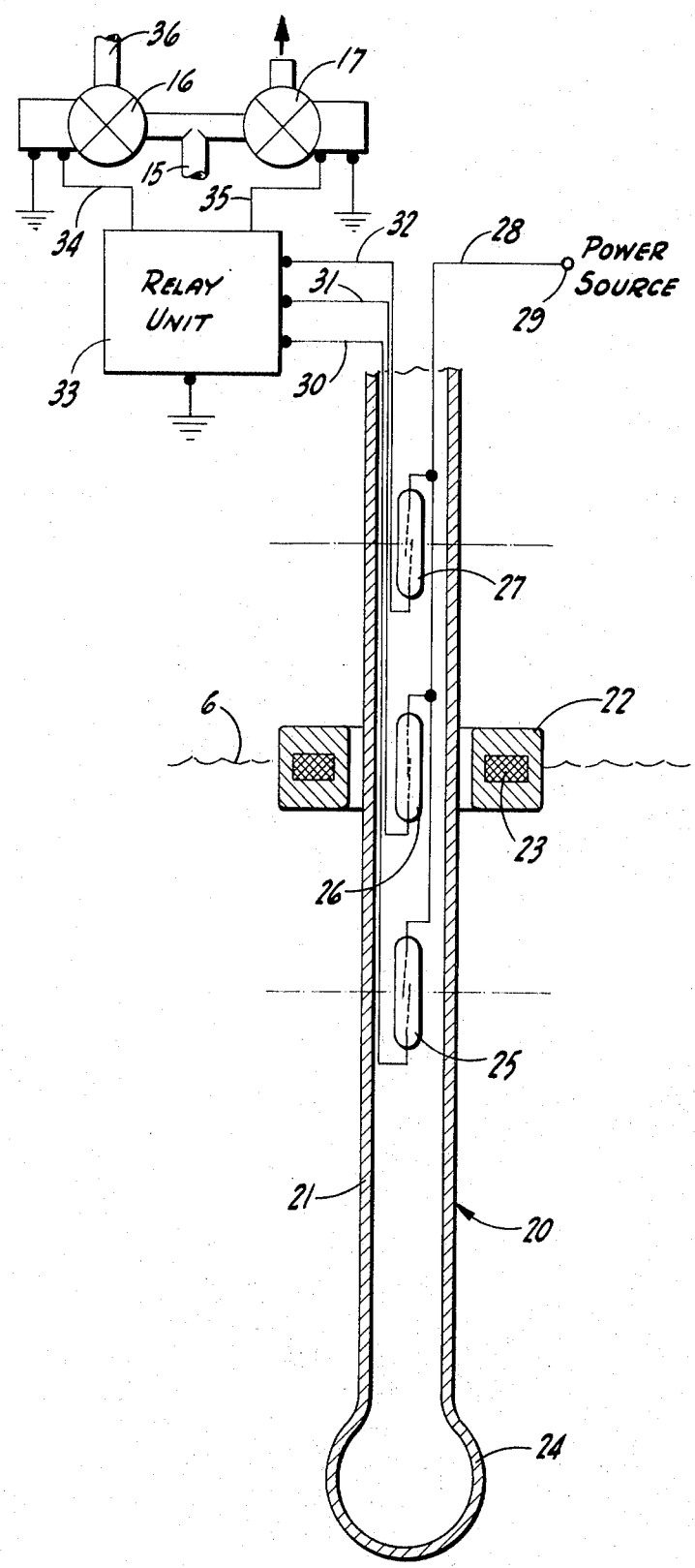

APPARATUS FOR REMOVING OXYGEN FROM LIQUIDS

BACKGROUND OF THE INVENTION

To improve the quality of a liquid food product—such as milk, fruit juice, vegetable juice, or the like—it is desirable to remove the oxygen from the product subsequent to processing but before containerization, and preferably in advance of heating as by pasteurization. This assures of the retention of color, flavor, aroma, vitamins, and nutrients while at the same time extending the shelf or storage time of the product.

It is known that the dispersion of nitrogen through such a product will effect a removal of oxygen therefrom, but the available apparatus has not been sufficiently effective for general commercial acceptance.

The present invention was conceived by me in a successful effort to provide an apparatus, for the described purpose, which will effectively and adequately serve commercial need in the field of processing liquid food products.

SUMMARY OF THE INVENTION

The present invention provides—as an important object and for practice of a method of removing oxygen from a pressure-fed, continuously-flowing liquid food product by nitrogen dispersed into such liquid—apparatus, in a first stage and under closed-to-atmosphere conditions, adapted to sparge the nitrogen into the liquid for transition therein counter to the direction of liquid flow, to accumulate a certain amount of the resultant oxygen-nitrogen mixture in a nitrogen-inerted headspace, and to vent such accumulated gaseous mixture to atmosphere from such headspace; all without interrupting the continuous flow of the liquid or materially effecting the feeding pressure thereof.

In a second stage of the apparatus, and likewise under closed-to-atmosphere conditions, the apparatus is adapted to accumulate, in another nitrogen-inerted headspace, the remainder of the oxygen-nitrogen mixture which gasses off from the liquid, and to vent such accumulated remainder of the oxygen-nitrogen mixture to atmosphere from said other headspace.

The present invention provides, as an additional important object, apparatus—as above—which includes, in each stage, a receptacle through which the liquid downflows; the receptacles being connected in series, the liquid being pressure-fed into the receptacle of the first stage and discharged from the receptacle of the second stage; the nitrogen being dispersed into the liquid in the first-stage receptacle by one or more sparger plates disposed therein.

The present invention provides, as another important object, apparatus—as above—wherein there is a normally closed, venting valve and a normally closed, nitrogen feeding valve on each receptacle in communication with the related headspace, said valves being electro-mechanical, and a float-controlled multiple switch unit in each receptacle operative to cause opening of the corresponding venting valve in response to the liquid in the receptacle falling below the normal surface level and to close the venting valve in response to such surface-level returning to normal, and to cause opening of the corresponding nitrogen feeding valve in response to the liquid in the receptacle rising above the normal surface level and to close the nitrogen-feeding valve in response to such surface level returning to normal. In this manner, there is—at different times—recurrent and automatic venting of the accumulated oxygen-nitrogen gas mixture from each headspace, and introduction of nitrogen into the latter to assure of maintenance of the desired inert gaseous condition therein.

The present invention provides, as a further object, an apparatus for removing oxygen from liquids which is designed for ease and economy of manufacture.

The present invention provides, as a still further object, a practical, reliable, and durable apparatus for removing oxygen from liquids, and one which is exceedingly effective for the purpose for which it is designed.

BRIEF DESCRIPTION OF THE DRAWINGS

FIG. 1 is an elevation, somewhat diagrammatic and partly in section, of the apparatus.

FIG. 2 is an enlarged, fragmentary, sectional elevation showing one of the float-controlled, multiple switch units embodied in the apparatus; the view including a diagrammatic representation of the related, circuit-connected electro-mechanical valves responsive to such switch unit.

DESCRIPTION OF THE PREFERRED EMBODIMENT

Referring now more particularly to the drawings and to the characters of reference marked thereon, the apparatus—for the practice of the described method—comprises in side-by-side relation, a first, closedtop tank 1 and a second, closed-top tank 2; both tanks being vertically elongated, with tank 1 of greater height but lesser diameter than tank 2. A feed pipe 3 delivers a liquid food product under pressure into tank 1 intermediate its ends; a transfer pipe 4 is connected between the bottom of tank 1 and tank 2 intermediate the ends of the latter; and an outlet pipe 5 leads from the bottom of said tank 2. With the above connections, the pressure-fed liquid food product is delivered into tank 1 to a normal surface level 6, down-flows in tank 1, then transfers into tank 2 to a normal surface level 7, down-flows in tank 2, and finally outlets from the bottom of said tank 2.

The series-connected tank assembly, as above, is adapted to be interposed or placed "in-line" in the conduit system of a liquid food processing plant ahead of the containerizing equipment and preferably ahead of the pasteurizer if this latter type of equipment is included in the line.

While the liquid L in the tanks 1 and 2 has normal surface levels, indicated at 6 and 7, respectively, such levels are subject to fluctuation due to certain operating conditions, such as variant demand by the containerizing equipment; such fluctuations in said surface levels being effectively employed —as will hereinafter appear—to cause certain automatic functions of the present apparatus.

A pair of vertically spaced sparger plates 8 are mounted in tank 1 below the point of entry of feed pipe 3, and such sparger plates are connected by branch conduits 9 leading from flow regulators 10 to which a conduit 11 supplies nitrogen under pressure; the nitrogen being fed to conduit 11 by a supply conduit 12 having a pressure regulator 13 therein.

The nitrogen, as delivered into the liquid L in tank 1 by sparger plates 8, is in the form of minute bubbles which rise in the liquid and strip a large percentage of the oxygen from the liquid; the resultant oxygen-nitrogen mixture being received in the closed-to-atmosphere headspace 14 above surface level 6 in tank 1.

A T-shaped conduit unit 15 is connected to, and upstands from, the top of tank 1; such conduit unit 15 being closed to atmosphere and having interposed in the top thereof a nitrogen-feeding valve 16, a venting valve 17, a safety pressure relief valve 18, and a safety vacuum-breaker valve 19. All of such valves are normally closed; the nitrogen-feeding valve 16 and the venting valve 17 being electro-mechanical and adapted to be opened by electrical energy fed thereto.

A float-controlled, multiple switch unit, indicated generally at 20, extends through the top of tank 1 and depends into the liquid therein to a lower end termination at least below the point of entry of pipe 3; such switch unit comprising a hollow vertical tube 21 surrounded by a ring-shaped float 22 which carries a magnet 23. The lower and closed end 24 of tube 21 is enlarged to provide a stop for the float 22.

The tube 21 has three initially open, reed-type, magnetically responsive switches mounted therein; such switches being indicated at 25, 26, and 27. The switch 25 is a distance below the normal surface level 6 of the liquid in tank 1; the switch 26 is at said normal surface level; and the switch 27 is a distance above such normal surface level. When the float 22 registers with any one switch (i.e., either switch 25, 26, or 27), the magnet 23 causes the switch to close.

The above-described, float-controlled switch unit functions, through any suitable circuitry, to cause—at certain times—opening and closing of the nitrogen-feeding valve 16 and the venting valve 17. For the purpose of diagrammatic illustration, such circuitry is here shown—in FIG. 2—as including an electrical power input lead 28 extending from a power source 29 into tube 21 to parallel connection with switches 25, 26, and 27. In turn, leads 30, 31, and 32 connect such switches to a relay unit 33. Energizing leads 34 and 35 connect the relay unit 33 to the nitrogen-feeding valve 16 and venting valve 17, respectively.

Nitrogen from the supply conduit 12 and pressure regulator 13 is delivered by a conduit 36 to the nitrogen-feeding valve 16; the latter, as indicated, being normally closed.

Upon the liquid L in tank 1 falling below the normal surface level 6 and to an extent that float 22 registers with switch 25, the latter closes, under the influence of magnet 23, and—through the medium of the connecting circuitry, including relay unit 33—the venting valve 17 is electrically energized and opens. This results in the accumulated oxygen-nitrogen mixture in headspace 14 venting to atmosphere, and—in consequence—the surface level 6 raises to normal, and at which time the float 22 registers with switch 26, and the magnet 23 closes such switch. When switch 26 is thus closed, the circuitry—including relay unit 33—de-energizes the venting valve 17, and the latter closes.

Upon the liquid L in tank 1 rising above the normal surface level 6 and to an extent that float 22 registers with switch 27, the latter is closed by the magnet 23, and—through the medium of the connecting circuitry, including relay unit 33—the nitrogen-feeding valve 16 is opened, and nitrogen under pressure delivers into the headspace 14 to assure of an inert gaseous condition therein. The introduction, from valve 16, of nitrogen under pressure into headspace 14 results in lowering of the surface level 6 to normal and consequent registering of the float 22 with switch 26 so that the magnet closes such switch. With closing of switch 26, the circuitry—including relay unit 33—de-energizes the nitrogen-feeding valve 16, and the latter closes.

Thus, in automatic response to the liquid L in tank 1 falling below or rising above the normal surface level 6, the headspace 14 is vented to atmosphere or inerted by nitrogen, respectively. In this way, the oxygen—stripped by nitrogen from the liquid L down-flowing in tank 1—is effectively and recurrently released from said tank without subjecting such liquid to atmosphere and oxygen contamination.

While the greatest amount of oxygen therein is gassed off from the liquid L in tank 1 and into the headspace 14 for venting therefrom, there is a residual carryover of the oxygen-nitrogen mixture in the liquid flowing into tank 2; the purpose of this latter tank, and the instrumentalities thereon, being to free such carried-over oxygen-nitrogen mixture from the liquid and to then vent it to atmosphere—again without exposure of the liquid to an atmospheric condition. This is accomplished in the same way as in tank 1, and hence there is included on tank 2 a T-shaped conduit unit 37 fitted with a nitrogen-feeding valve 38, a venting valve 39, a safety pressure relief valve 40, and a safety vacuum-breaker valve 41. The nitrogen-feeding valve 38 is connected to the nitrogen-delivery conduit 36 by branch conduit 42.

The nitrogen-feeding valve 38 and the venting valve 39 are—as before—of electro-mechanical type and normally closed; such valves 38 and 39 being actuated by a float-controlled multiple switch unit, indicated generally at 43, depending into tank 2 from the top thereof and including a vertical, switch-enclosing tube 44 surrounded by a ring-shaped float 45 provided with a magnet. The tube 44 is closed and enlarged at its lower end 46. The switch unit 43 is electrically related to valves 38 and 39 in the same manner as the corresponding parts on tank 1.

In tank 2, the remainder of any oxygen-nitrogen mixture gasses off from the liquid into the headspace 47, and is then recurrently vented therefrom (and such headspace nitrogen inerted) in the same manner as in tank 1. Therefore, repetitive description is here unnecessary. It is to be noted, however, that as the surface of the liquid L in tank 2 is of larger area than that in tank 1, there is greater assurance that any remaining oxygen-nitrogen mixture will gas off into headspace 47, and that the liquid food product—as it outlets from the bottom of tank 2—is substantially free of oxygen.

From the foregoing description, it will be readily seen that there has been produced such an apparatus for removing oxygen from liquids as substantially fulfills the objects of the invention, as set forth herein.

While this specification sets forth in detail the present and preferred construction of the apparatus, still in practice such deviations from such detail may be resorted to as do not form a departure from the spirit of the invention, as defined by the appended claims.

I claim:

1. An apparatus—for removing oxygen from a pressure-fed, continuously-flowing liquid food product by the method of stripping the oxygen from the liquid by nitrogen—comprising a closed-to-atmosphere receptacle through which the liquid flows, the receptacle providing a headspace above a normal surface level of the liquid in the receptacle, means to disperse nitrogen into the liquid for upward transition therein, resultant oxygen-nitrogen gas mixture escaping the liquid and accumulating in the headspace, and instrumentalities associated with the receptacle operative to vent the accumulated gas mixture from the headspace to atmosphere in response to the liquid in the receptacle falling below said normal surface level, and to introduce nitrogen under pressure into the headspace in response to the liquid in the receptacle rising above such normal surface level, either such event causing return of said surface level to normal.

2. Apparatus, as in claim 1, in which said means to disperse nitrogen into the liquid includes a sparger plate submerged in the liquid in the receptacle.

3. Apparatus, as in claim 1, in which the receptacle is a vertically elongated tank, and said means to disperse nitrogen into the liquid including vertically spaced sparger plates submerged in the liquid in the receptacle.

4. Apparatus, as in claim 1, in which the receptacle is a vertically elongated tank, the liquid being fed into the tank at a point intermediate the top and bottom thereof, and thence flowing downwardly to and outletting from said tank bottom; and said means to disperse nitrogen into the liquid including a sparger plate assembly disposed below said point and submerged in the liquid in the receptacle.

5. Apparatus, as in claim 1, in which said instrumentalities include a normally closed venting valve, a normally closed nitrogen-feeding valve, such valves being in communication with the headspace, a float in the receptacle, and float-controlled means operative to cause said opening of the venting valve and opening of the nitrogen-feeding valve in response to the liquid in the receptacle falling below or rising above, respectively, said normal surface level, and in either event to cause closing of the corresponding valve upon said surface level returning to normal.

6. Apparatus, as in claim 5, in which the venting valve and the nitrogen-feeding valve are each electromechanical, and said float-controlled means includes a plurality of electrical switches, a float operative to independently actuate said switches, and control circuitry between the switches and valves.

7. Apparatus, as in claim 6, including a tube depending into the liquid in the receptacle, the tube being closed to entry of the liquid, the float being of ring-form and surrounding the tube intermediate its ends, a magnet on the float, and the switches being mounted in vertically spaced relation in the tube and within the range of movement of the float on the tube; each switch, upon the float substantially registering therewith, being responsive to the magnet.

8. An apparatus—for removing oxygen from a pressure-fed, continuously-flowing liquid food product by the method of stripping the oxygen from the liquid by nitrogen—comprising a closed-to-atmosphere tank through which the liquid downflows, the tank providing a headspace above a normal surface level of the liquid in the tank, means in the tank adapted to sparge nitrogen into the liquid for upward transition therein, resultant oxygen-nitrogen gas mixture escaping the liquid and accumulating in the headspace, a normally closed valve on the tank adapted when opened to vent the accumulated gas mixture from the headspace to atmosphere, another normally closed valve on the tank adapted when opened to introduce nitrogen under pressure into the headspace, a float in the tank on the liquid therein, and float-controlled means operative to open said first and second named, normally closed valves in response to the liquid in the tank falling below and rising above, respectively, said normal surface level, and in either such event to cause reclosing of the related valve upon said surface level in the tank returning to normal.

9. Apparatus, as in claim 8, including another closed-to-atmosphere tank beyond and connected in series with said first-named tank and in which other tank the liquid downflows, said other tank providing a corresponding headspace above a normal surface level of the liquid in such other tank, residual oxygen-nitrogen gas mixture escaping the liquid in said other tank and accumulating in such corresponding headspace, a third normally closed valve, the latter being on said other tank and adapted when opened to vent the accumulated gas mixture from said last-named headspace to atmosphere, a fourth normally closed valve, the latter being on said other tank and adapted when opened to introduce nitrogen under pressure into said corresponding headspace, a separate float in said other tank on the liquid therein, and means controlled by such separate float operative to open said third and fourth, normally closed valves in response to the liquid in said other tank falling below and rising above, respectively, said normal surface level in such other tank, and in either event to cause reclosing of the related valve upon said surface level returning to normal in said other tank.

10. Apparatus, as in claim 1, including another closed-to-atmosphere receptacle beyond and connected in series with said first-named receptacle, said other receptacle providing a corresponding headspace above a normal surface level of the liquid in such other receptacle, residual oxygen-nitrogen gas mixture escaping the liquid in said other receptacle and accumulating in such corresponding headspace, and separate instrumentalities associated with said other receptacle corresponding, and operative in like fashion, to the instrumentalities associated with said first-named receptacle.

* * * * *